(12) United States Patent
Yamashita

(10) Patent No.: US 6,181,259 B1
(45) Date of Patent: Jan. 30, 2001

(54) VEHICLE-MOUNTED DEVICE WITH SLEEP FUNCTION FOR USE IN ROAD-TO-VEHICLE COMMUNICATION SYSTEM

(75) Inventor: Hiroshi Yamashita, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/518,785

(22) Filed: Mar. 3, 2000

(30) Foreign Application Priority Data

Mar. 8, 1999 (JP) .................................................. 11-060543

(51) Int. Cl.[7] ........................................................ G08G 1/00
(52) U.S. Cl. ........................ 340/901; 340/933; 340/905; 340/539
(58) Field of Search .................................. 340/901, 933, 340/905, 539

(56) References Cited

FOREIGN PATENT DOCUMENTS

| | | |
|---|---|---|
| 7-264775 | 10/1995 | (JP) . |
| 7-294617 | 11/1995 | (JP) . |
| 10-289342 | 10/1998 | (JP) . |
| 10-290193 | 10/1998 | (JP) . |

*Primary Examiner*—Daryl Pope
(74) *Attorney, Agent, or Firm*—Sughrue, Mion, Zinn, Macpeak & Seas, PLLC

(57) ABSTRACT

There is disclosed a vehicle-mounted device with a sleep function for use in a road-to-vehicle communication system. After having indicated a switching period $T_1$ and reception frequencies F1, F2 to a frequency switching controller, a controller stops operation of an internal counter, and enters a sleep mode until it cancels the sleep mode in response to a detected signal from a receiver. While a vehicle with the vehicle-mounted device is running outside of a communication range of a road radio unit installed at a toll gate or the like, the frequency switching controller independently performs a frequency search process on an RF module, and the controller is in the sleep mode. Therefore, the vehicle-mounted device has a relatively low power requirement.

6 Claims, 4 Drawing Sheets

VEHICLE-MOUNTED DEVICE WITH SLEEP FUNCTION FOR USE IN ROAD-TO-VEHICLE COMMUNICATION SYSTEM

BACKGROUND OF THE INVENTION

1. Field of the Invention

The present invention relates to an electronic toll collection (ETC) system for an intelligent transport system (ITS).

2. Description of the Related Art

As shown in FIG. 1 of the accompanying drawings, an ETC system is a road-to-vehicle communication system for collecting expressway tolls from running vehicles via radio communications between a vehicle-mounted device 50 on a vehicle and a road radio unit 100 installed in a toll gate. A conventional radio communication process which is carried out by the vehicle-mounted device 50 on the vehicle that has entered an expressway, for radio communication with the road radio unit 100 in the ETC system will be described below.

As shown in FIG. 1, the road radio unit 100 in the ETC system normally uses two frequencies, i.e., frequencies F1, F2. These two frequencies F1, F2 are used to avoid radio wave interference between plural lanes at entrance and exit toll gates. The frequencies F1, F2 are assigned respectively to adjacent ones of the lanes, and the same frequency is not assigned to successive ones of the lanes. The road radio unit 100 has a narrow communication range in order to avoid radio wave interference between the lanes.

In order for the vehicle-mounted device 50 to effect normal radio communications with the road radio unit 100 at a toll gate or lane of an expressway, the vehicle-mounted device 50 needs to perform bi-directional data communications with the road radio unit 100 within a short period of time of several 100 msecs. in which the vehicle-mounted device 50 runs into and out of the narrow communication range of the road radio unit 100. Therefore, the vehicle-mounted device 50 has to detect, at a high speed, that it enters the communication range of the road radio unit 100. However, since the vehicle-mounted device 50 cannot recognize, in advance, the lane along which the vehicle enters a toll gate, the vehicle-mounted device 50 is unable to know, in advance, which of the frequencies F1, F2 the carrier transmitted from the road radio unit 100 is using. Consequently, the vehicle-mounted device 50 carries out a frequency search process for switching between the frequencies F1, F2 at a high speed so that the vehicle-mounted device 50 can detect the carrier of either one of the frequencies F1, F2 transmitted from the road radio unit 100 whenever the vehicle-mounted device 50 may enter the communication range of the road radio unit 100. The vehicle-mounted device 50 carries out the frequency search process at all times even if it is outside of the communication range of the road radio unit 100.

An arrangement of the conventional vehicle-mounted device 50 will be described below with reference to FIG. 2 of the accompanying drawings. As shown in FIG. 2, the conventional vehicle-mounted device 50 comprises a controller 41, a receiver 43, and an RF (Radio Frequency) module 4.

The controller 41, which comprises a programmed CPU, exchanges data with the receiver 43 and the RF module 4 via a CPU bus line 5. The controller 41 also controls the RF module 4 to perform a frequency search process to switch between the received frequencies F1, F2 at a constant switching period $T_1$. When the controller 41 detects the reception by the RF module 4 of a carrier sent from the road radio unit 100 in response to a level-detected signal 10 from the RF module 4, the controller 41 stops the frequency search process, and performs road-to-vehicle communications with the road radio unit 100 at a fixed frequency.

The receiver 43 detects a unique word from demodulated data 8 from the RF module 4 and checks the demodulated data 8 from the RF module 4 with a CRC (Cyclic Redundancy Check) code, and sends the detected result via the CPU bus line 5 to the controller 41.

The RF module 4 has a local oscillator with a frequency synthesizer. The RF module 4 receives the carrier sent from the road radio unit 100 at a frequency indicated from the controller 41 via the CPU bus line 5, and demodulates the received carrier. The RF module 4 has a level detector which outputs a level-detected signal 10 to the controller 41 when it detects the carrier sent from the road radio unit 100.

Operation of the conventional vehicle-mounted device 50 will be described below with reference to FIG. 2. When the controller 41 is turned on, the controller 41 performs the frequency search process to switch between the received frequencies F1, F2 at the constant switching period $T_1$ (see FIG. 3 of the accompanying drawings). In the RF module 4, the frequency of the local oscillator is controlled so as to be able to receive the frequencies F1, F2. The switching period $T_1$ is generated by an internal counter of the controller 41, and is set, in advance, to a suitable value according to the frame period of the carrier, which is of a time-division frame structure, sent from the road radio unit 100.

Operation of the conventional vehicle-mounted device 50 as the vehicle enters the communication range of the road radio unit 100 will be described below. It is assumed, for example, that the vehicle enters the communication range of the road radio unit 100 which is sending the carrier at the frequency F1.

When the vehicle with the vehicle-mounted device 50 enters the communication range of the road radio unit 100, the reception frequency of the vehicle-mounted device 50 is switching alternately between frequencies F1, F2 at the constant switching period $T_1$ according to the frequency search process. When the reception frequency of the vehicle-mounted device 50 is tuned with the carrier frequency F1 sent from the road radio unit 100 as a result of the frequency search process and the level detector in the RF module 4 detects the carrier from the road radio unit 100, the RF module 4 sends a level-detected signal 10 to the controller 41. The controller 41 stops the frequency search process, and fixes the reception frequency of the RF module 4 to F1.

Subsequently, the carrier, which is of a time-division frame structure, sent from the road radio unit 100 is demodulated by the RF module 4 of the vehicle-mounted device 50. The receiver 43 detects a unique word from demodulated data 8 from the RF module 4 and checks the demodulated data 8 from the RF module 4 with a CRC code. The detected result is supplied to a reception management area in the receiver 43. The controller 41 monitors the reception management area via the CPU bus line 5. When the carrier is received well in as many successive frames as a back guard count (N1), the controller 41 judges the reception condition as the establishment of frame synchronization. After the establishment of frame synchronization, road-to-vehicle bi-directional data communications are carried out according to a time-division multiplex communication process.

When the vehicle-mounted device 50 finishes the bi-directional data communications and the vehicle runs out of the communication range of the road radio unit 100, the controller 41 attempts to detect a reception failure in the reception management area in the receiver 41. When the carrier is not received well in as many successive frames as a forward guard count (N2), the controller 41 judges the reception condition as the lack of frame synchronization. The controller 41 then restarts the frequency search process and enters a steady state. The above communication procedure is applicable in the communication range of the road radio unit 100 both at a toll gate and in a lane.

The vehicle-mounted device 50 of the conventional road-to-vehicle communication system repeats the frequency search process in order to detect the carrier sent from the road radio unit 100 at all times even outside of the communication range of the road radio unit 100. This is because the vehicle-mounted device 50 should start road-to-vehicle communications immediately when the vehicle-mounted device 50 enters the communication range of the road radio unit 100. Therefore, the controller 41 in the vehicle-mounted device 50 continues the frequency search process to switch between the received frequencies while operating the internal counter at all times after being initialized.

In the above ETC system, since the communication range of the road radio unit 100 is relatively narrow, the time spent for communications when the vehicle passes through a toll gate or the like is several 100 msecs. On the other hand, the time in which the vehicle-mounted device 50 moves outside of the communication range of the road radio unit 100 ranges from several minutes to several tens of minutes depending on different conditions.

While the controller 41 in the vehicle-mounted device 50 may perform road-to-vehicle communications only for several 100 msecs., the controller 41 thereby needs to operate at all times because of the frequency search process carried out at all times. With the controller 41 comprising a programmed CPU, the switching period $T_1$ is counted by the internal counter thereof, and hence the controller 41 has a large power requirement.

Accordingly, the power consumption by the vehicle-mounted device 50 in its entirety remains essentially the same when the vehicle-mounted device 50 performs road-to-vehicle communications with the road radio unit 100 and when the vehicle-mounted device 50 carries out the frequency search process while the vehicle is outside of the communication range of the road radio unit 100. Thus, the vehicle-mounted device 50 causes a wasteful consumption of electric power. There has been a demand for lowering the power requirement of the vehicle-mounted device 50.

SUMMARY OF THE INVENTION

It is therefore an object of the present invention to provide a vehicle-mounted device which is of a relatively low power requirement for use in a road-to-vehicle communication system.

To achieve the above object, a vehicle-mounted device for use in a road-to-vehicle communication system according to the present invention has an RF module, a receiver, a frequency switching controller, and a controller.

The RF module receives and demodulates a carrier sent from a road radio unit.

The receiver receives demodulated data from the RF module and outputs a detected signal in response to detection of predetermined data contained in the demodulated data.

The frequency switching controller performs a frequency search process to switch between reception frequencies of the RF module at a preset switching period and a plurality of preset reception frequencies. The frequency switching controller stops the frequency search process when supplied with the detected signal from the receiver, and controls the RF module to keep receiving the reception frequency at the time the detected signal from the receiver is supplied.

The controller sets the switching period and the reception frequencies in the frequency switching controller. Thereafter, the controller enters a sleep mode after elapse of a predetermined time. In response to the detected signal, the controller cancels the sleep mode and performs road-to-vehicle communications with the road radio unit using data received by the receiver.

While a vehicle with the vehicle-mounted device is running outside of a communication range of the road radio unit which is installed at a toll gate or a lane of an expressway, for example, the frequency switching controller independently performs the frequency search process on the RF module, and the controller is in the sleep mode. Therefore, the vehicle-mounted device may have a relatively low power requirement.

The above and other objects, features, and advantages of the present invention will become apparent from the following description with reference to the accompanying drawings which illustrate an example of the present invention.

DETAILED DESCRIPTION OF THE PREFERRED EMBODIMENT

Figure 1:
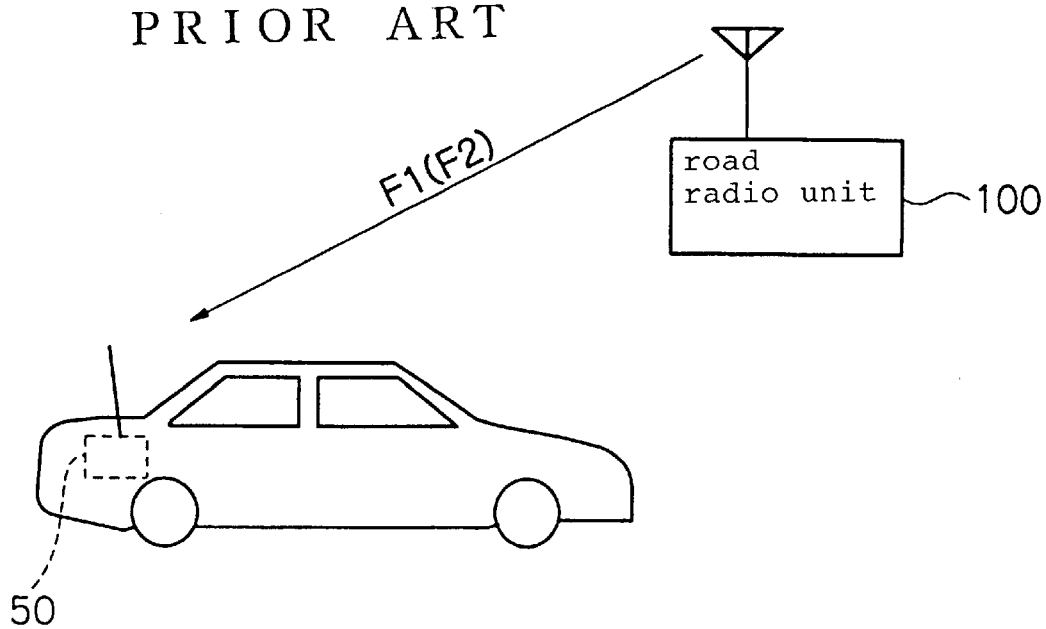
FIG. 1 is a block diagram of an ETC system.
Figure 2:
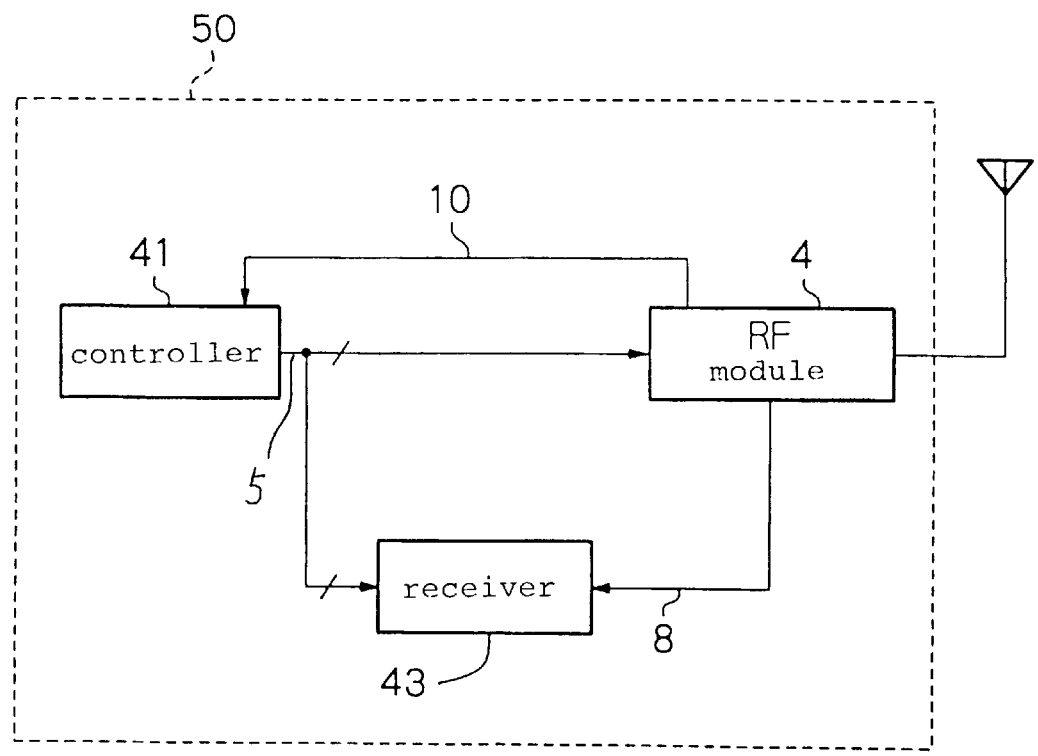
FIG. 2 is a block diagram of a conventional vehicle-mounted device.
Figure 3:
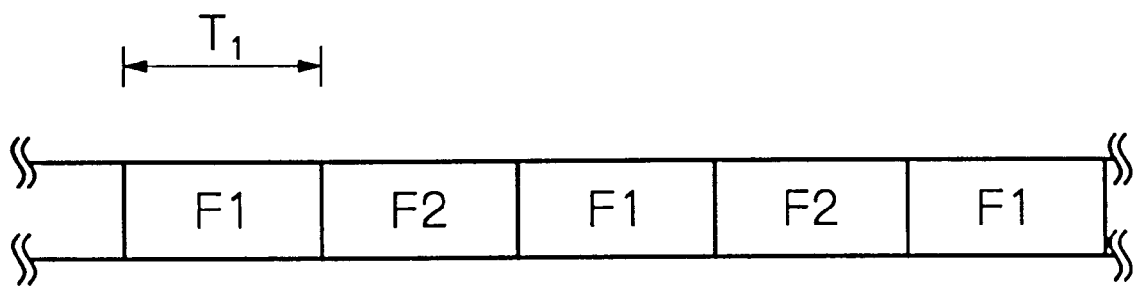
FIG. 3 is a diagram illustrative of the operation of an RF module for switching between received frequencies.
Figure 4:
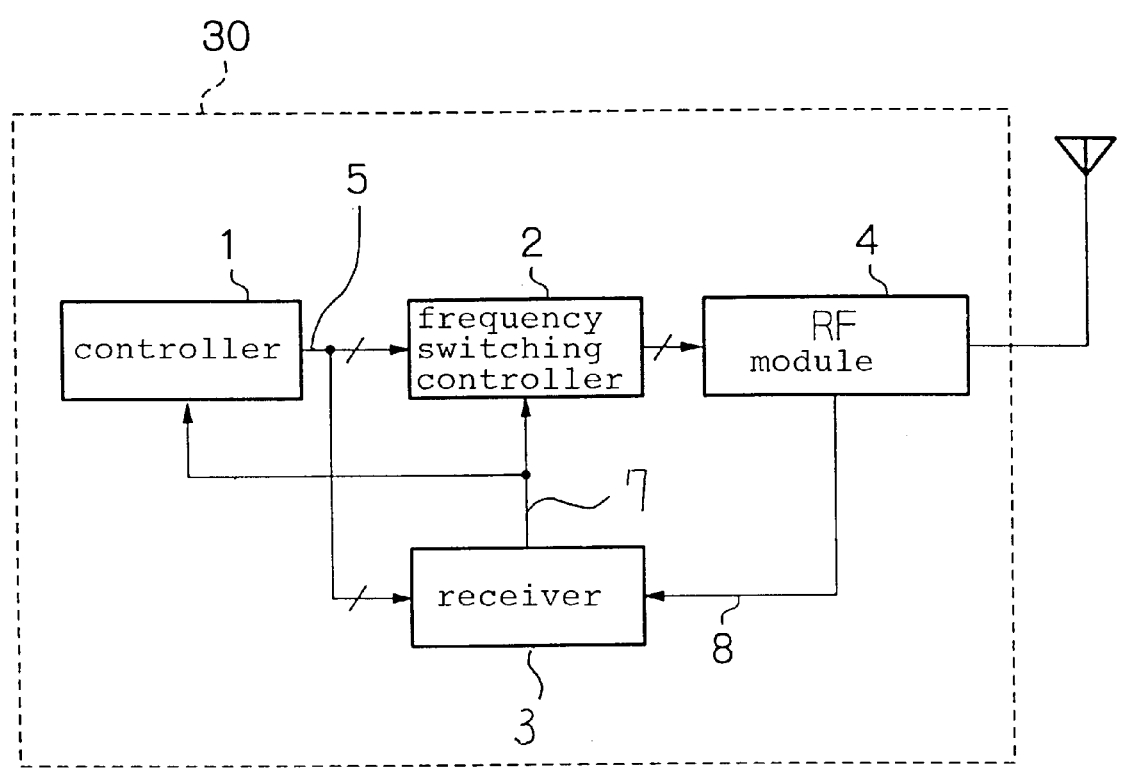
FIG. 4 is a block diagram of a vehicle-mounted device according to the present invention.

A road-to-vehicle communication system according to an embodiment of the present invention is similar to the road-to-vehicle communication system shown in FIG. 1 except that a vehicle-mounted device 30 shown in FIG. 4 is employed in place of the vehicle-mounted device 50. Those parts of the vehicle-mounted device 30 which are identical to those shown in FIGS. 1 and 2 are denoted by identical reference numerals.

As shown in FIG. 4, the vehicle-mounted device 30 according to the present invention comprises a controller 1, a frequency switching controller 2, a receiver 3, and an RF module 4.

The RF module 4 receives the carrier sent from the road radio unit 100 and demodulates the received carrier. As with the receiver 43 in the conventional vehicle-mounted device 50 shown in FIG. 2, the receiver 3 receives demodulated data 8 from the RF module 4, detects a unique word contained in the demodulated data 8, and outputs a detected signal 7 to the controller 1 and the frequency switching controller 2.

The frequency switching controller 2 comprises a flip-flop circuit or the like. The frequency switching controller 2 performs a frequency search process to switch between reception frequencies of the RF module 4 at a switching period T1 and received frequencies F1, F2 which have been set up by the controller 1 via the CPU bus line 5. In response to the detected signal 7 from the receiver 3, the frequency switching controller 2 stops the frequency search process, and controls the RF module 4 to continuously receive the frequency F1 or F2 received at the time the detected signal 7 is applied.

The controller 1 is connected to the frequency switching controller 2 and the receiver 3 by the CPU bus line 5, and transfers monitor and control information to and from the frequency switching controller 2 and the receiver 3. The controller 1, which comprises a programmed CPU, sets the switching period T1 and the received frequencies F1, F2 in the frequency switching controller 2, and, upon elapse of a certain time $T_2$ thereafter, stops its internal counter to enter a sleep mode. When supplied with the detected signal 7 from the receiver 3, the controller 1 cancels the sleep mode, and performs road-to-vehicle communications with the road radio unit 100 using data received by the receiver 3.

Operation of the vehicle-mounted device 30 according to the present embodiment will be described in detail with reference to FIG. 4.

When the vehicle-mounted device 30 is turned on, the program in the controller 1 starts operating to initialize the component modules of the vehicle-mounted device 30. At this time, the controller 1 controls the frequency switching controller 2 via the CPU bus line 5 to set up frequency data for the local oscillator in the RF module 4 so that the reception frequency of the RF module 4 will be F1 or F2. The controller 1 also controls the frequency switching controller 2 to set an appropriate value of the switching period $T_1$ for the received frequencies, depending on the frame period of the carrier, which is of a time-division frame structure, sent from the road radio unit 100.

After component modules of the vehicle-mounted device 30 have been initialized, the frequency switching controller 2 starts performing the frequency search process to switch between the reception frequencies of the RF module 4 at the switching period $T_1$ independently of the controller 1. The frequency search process continues until the vehicle-mounted device 30 enters the communication range of the road radio unit 100, the reception frequency of the RF module 4 is tuned with the carrier sent from the road radio unit 100, and the receiver 3 detects a unique word from the demodulated data 8 received from the RF module 4. When the receiver 3 detects a unique word, the receiver 3 sends a detected signal 7 to the frequency switching controller 2 and the controller 1. Upon arrival of the detected signal 7, the frequency switching controller 2 stops performing the frequency search process.

Upon elapse of the time T2 after the initializing process, the controller 1 has stopped operating the internal counter and entered the sleep mode. In response to the reception of the detected signal 7, the controller 7 cancels the sleep mode, and the program thereof starts operating (wake-up mode).

The controller 1 which has entered the wake-up mode starts monitoring the reception management area in the receiver 3 via the CPU bus line 5. The reception management area stores a reception history for each frame, which comprises time-division control information sent from the road radio unit 100 and its reception status.

A frame arrangement of the carrier from the road radio unit 100 will be described by way of example with reference to FIG. 5.

Downlink data from the road radio unit 100 to the vehicle-mounted device 30 comprises a plurality of frames 21 each comprising control information 22 and a pair of MDCs (Message Data Channels) $24_1$, $24_2$. The control information 22 contains CRC 23. Uplink data from the vehicle-mounted device 30 to the road radio unit 100 comprises a pair of MDCs $25_1$, $25_2$.

The time-division control information is used in a function to generate reception frame timing in the receiver 3. Immediately after having entered the wake-up mode, the controller 1 confirms the reception status of a first frame. If a unique word is detected and a CRC is performed well, then the controller 1 increments a program-generated back guard counter by "1". The controller 1 repeats the same operation after having received a second frame. When the CRC is performed well successively N1 times, the controller 1 judges the reception condition as the establishment of frame synchronization. The value of N1 is arbitrarily set up by the radio system, and represents a back guard count.

Figure 5:
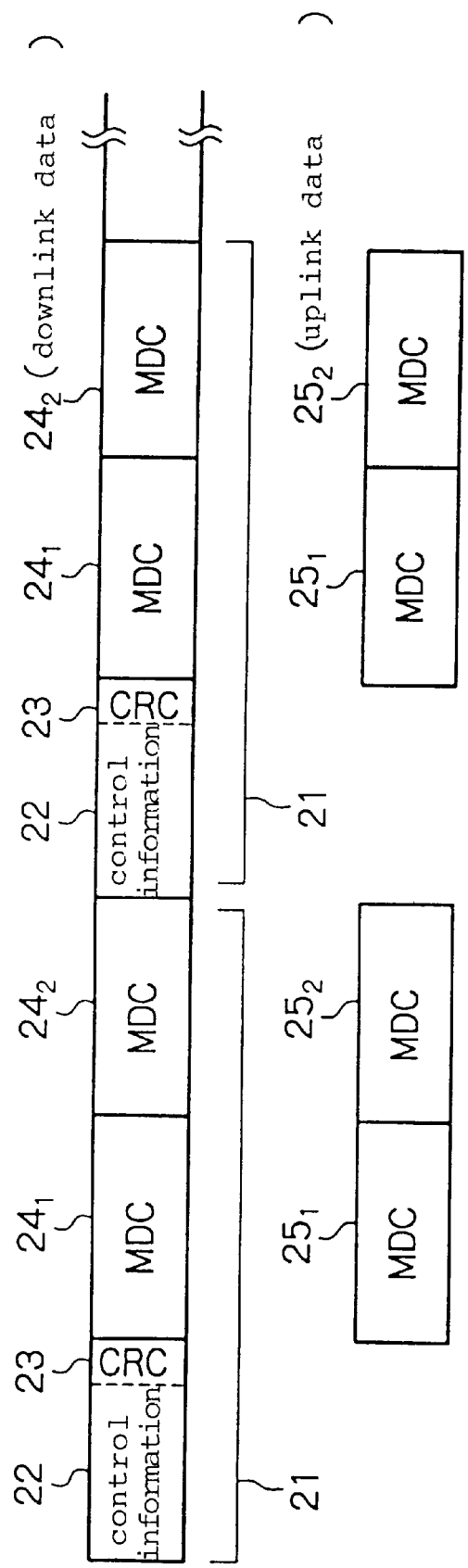
FIG. 5 is a diagram of a frame arrangement of a carrier from a road radio unit.

After the establishment of frame synchronization, data is transmitted from the road radio unit 100 to the vehicle-mounted device 30 using the time slot of MDC $24_1$ or MDC $24_2$ shown in FIG. 5, and data is transmitted from the vehicle-mounted device 30 to the road radio unit 100 using the time slot of MDC $25_1$ or MDC $25_2$.

When the bi-directional data communications are finished and the vehicle with the vehicle-mounted device 30 runs out of the communication range of the road radio unit 100, the vehicle-mounted device 30 is unable to receive the carrier from the road radio unit 100. The controller 1 detects a reception failure based on a unique word detection failure or a CRC error in the reception management area. When the reception failure continues for as many successive frames as N2, the controller 1 judges the reception condition as the lack of frame synchronization, and initializes the frequency switching controller 2. The initialized frequency switching controller 2 starts performing the frequency search process again. The controller 1 enters the sleep mode after elapse of the time $T_2$ measured by the program therein.

The power requirement of the frequency switching controller 2 which comprises a flip-flop circuit or the like is smaller than the power requirement of the controller 1 with the internal counter. Therefore, the power requirement of the vehicle-mounted device 30 in the road-to-vehicle communication system according to the present invention is smaller than the power requirement of the conventional vehicle-mounted device 50.

The value of the switching period $T_1$ may need to be rechecked when a service provided by road-to-vehicle communications is added and the frame period of the carrier sent from the road radio unit 100 is varied, for example. In the vehicle-mounted device 30, therefore, the switching period $T_1$ set in the frequency switching controller 2 by the controller 1 is not of a fixed value, but may be varied by the program installed in the controller 1.

In the above embodiment, the two carrier frequencies F1, F2 are used between the vehicle-mounted device 30 and the road radio unit 100. However, the principles of the present invention are also applicable to three or more carrier frequencies.

While a preferred embodiment of the present invention has been described using specific terms, such description is for illustrative purposes only, and it is to be understood that changes and variations may be made without departing from the spirit or scope of the following claims.

What is claimed is:

1. A vehicle-mounted device mounted on a vehicle for use in a road-to-vehicle communication system for radio communications with a road radio unit disposed on a road, said device comprising:

an RF module for receiving and demodulating a carrier sent from the road radio unit;

a receiver for receiving demodulated data from said RF module and outputting a detected signal in response to detection of predetermined data contained in the demodulated data;

a frequency switching controller for performing a frequency search process to switch between reception frequencies of said RF module at a preset switching period and a plurality of preset reception frequencies, stopping said frequency search process when supplied with the detected signal from said receiver, and controlling said RF module to keep receiving the reception frequency at the time the detected signal from said receiver is supplied; and a controller for setting the switching period and the reception frequencies in said frequency switching controller, thereafter entering a sleep mode after elapse of a predetermined time, and canceling the sleep mode in response to said detected signal and performing road-to-vehicle communications with the road radio unit using data received by said receiver.

2. A vehicle-mounted device according to claim 1, wherein said predetermined data contained in the demodulated data comprises a unique word.

3. A vehicle-mounted device according to claim 1, wherein said road-to-vehicle communications performed with the road radio unit by said controller comprise time-division multiplex communications using one frequency for uplink and downlink communications.

4. A vehicle-mounted device according to claim 1, wherein said switching period set in said frequency switching controller by said controller is variable.

5. A vehicle-mounted device according to claim 4, wherein said predetermined data contained in the demodulated data comprises a unique word.

6. A vehicle-mounted device according to claim 4, wherein said road-to-vehicle communications performed with the road radio unit by said controller comprise time-division multiplex communications using one frequency for uplink and downlink communications.

* * * * *